UNITED STATES PATENT OFFICE.

CARL RUDER, OF WANDSBEK, NEAR HAMBURG, GERMANY.

PROCESS FOR THE MANUFACTURE OF CAMPHOR FROM BORNEOL OR ISOBORNEOL.

1,066,758.     Specification of Letters Patent.     Patented July 8, 1913.

No Drawing.     Application filed November 18, 1912. Serial No. 731,978.

*To all whom it may concern:*

Be it known that I, CARL RUDER, doctor of philosophy, analytical chemist, a subject of the King of Bavaria, residing at Wandsbek, near Hamburg, in the State of Prussia, German Empire, have invented certain new and useful Improvements in Processes for the Manufacture of Camphor from Borneol or Isoborneol, of which the following is a specification.

It has already been proposed to convert borneol or its equivalent isoborneol into camphor by oxidation with chromic acid. It has however been a difficult matter to carry out that process in such a manner as to produce a useful camphor in large quantity free from borneol.

When it is attempted to oxidize borneol directly, that is without the addition of a solvent, the reaction is extremely slow and is never complete. If solutions of borneol or isoborneol are employed in any non-oxidizable solvent the action of chromic acid, even with the use of very dilute solutions of chromic acid, is so violent that the oxidation progresses to such an extent as to diminish the yield very considerably. It has been attempted to prevent these by-reactions and the formation of condensation products by adding sulfanilic acid or similar compounds to the chromic acid mixture. This method is however very expensive because the sulfanilic acid (15 parts to 50 parts of borneol) oxidizes away and therefore more chromic acid has to be used.

The present invention is based on the discovery that if the solvent is added gradually to the mixture of chromic acid and borneol, the oxidation is effected quite uniformly and approximately theoretical yields are obtained.

It is quite immaterial whether concentrated or dilute chromic acid mixtures are employed. In all cases it is possible to accelerate or moderate the progress of the oxidation by adding larger or smaller quantities. By this process a perfectly pure camphor having the right melting-point can be produced with an almost theoretical yield.

The improved process may be carried out as follows:—

Example I: 100 g. of sodium bichromate are dissolved in 160 g. of water, and 125 g. of sulfuric acid (S. G. 1, 84) are added to the solution. This concentrated chrome solution is then diluted with 1400 g. of water. When this mixture has become cold, 100 g. of borneol or its equivalent isoborneol are introduced therein, and then 5 g. of benzene ($C_6H_6$) or other non-oxidizable solvent are added while stirring. This last addition is repeated every half-hour until in the course of 2¼ hours 30 g. of benzene have been added. After the lapse of a further half-hour when the oxidation is almost completed, 50 g. of benzene are added all at once for the purpose of completely dissolving the camphor that has been formed and of oxidizing completely any particles of borneol that may still remain covered. The mixture is then stirred for about one hour. On the termination of the reaction the camphor-benzene solution is separated out, washed in a little soda solution, and then the solvent is distilled off, leaving behind 95 parts of pure white camphor which without being further purified shows a melting-point of 175 to 176° C.

Example II: 100 g. of sodium bichromate are dissolved in 400 g. of water, and to this solution there are then added 125 g. of sulfuric acid, and when cold, 100 g. of borneol. After having started a powerful stirring apparatus, the gradual adding of the solvent is begun. The quantity of benzene (75 grams) which is to be added in order to dissolve completely the camphor that is being formed is preferably spread over the period of addition (7½ hours) as follows:—

| | |
|---|---|
| At the beginning | 1 g. of benzene. |
| After one hour | 1 " " " |
| After the second hour | 1 " " " |
| After the next half hour | 1 " " " |
| " " " " " | 1 " " " |
| " " " " " | 1 " " " |
| " " " " " | 2 " " " |
| " " " " " | 3 " " " |
| " " " " " | 3 " " " |
| " " " " " | 4 " " " |
| " " " " " | 5 " " " |
| " " " " " | 10 " " " |
| " " " " " | 13 " " " |
| " " " " " | 37 " " " |
| Total | 83 g. of benzene |

When all the benzene has been added the stirring is continued for one hour longer. The benzene-camphor solution is then separated out from the chrome solution and washed in water and soda solution until the color is completely discharged. Then dried with common salt and filtered, whereupon the solvent is distilled off, leaving behind 95 parts of camphor which melts at 175 to 176° C. without further purification.

The added amounts of benzene mentioned in the foregoing examples are naturally dependent on the degree of concentration of the chromic acid mixture employed. The process may be retarded at will by adding the solvent still more slowly. The added quantities should as far as possible be such that the temperature of the oxidation mixture does not rise beyond 25 to 30° C.

I claim:

1. An improved process for the manufacture of camphor from borneol by oxidation with chromic acid, consisting in adding a neutral solvent to a mixture of the borneol with chromic acid gradually in quantities such that the heat of reaction produced by the oxidation will not cause any local overheating, substantially as described.

2. An improved process for the manufacture of camphor from borneol by oxidation with chromic acid, consisting in adding benzene to a mixture of the borneol with chromic acid gradually in quantities such that the heat of reaction produced by the oxidation will not cause any local overheating, substantially as described.

3. An improved process for the manufacture of camphor from borneol by oxidation with chromic acid, consisting in gradually adding a neutral solvent to mixtures of concentrated chromic acid and borneol in small quantities at intervals.

4. An improved process for the manufacture of camphor from borneol by oxidation with chromic acid, consisting in gradually adding to mixtures of concentrated chromic acid and borneol, small quantities of a neutral solvent.

5. An improved process for the manufacture of camphor from borneol by oxidation, consisting in adding a neutral solvent to a mixture of the borneol with chromic acid gradually in quantities such that the temperature of the oxidation mixture does not rise beyond 25 to 30° C., substantially as described.

In testimony whereof I affix my signature in presence of two witnesses.

CARL RUDER.

Witnesses:
ERNEST H. L. MUMMENHOFF,
EDWARD HOPP.